Feb. 10, 1970 — R. W. STOFFEL — 3,494,571
CLAMPING DEVICE FOR A SEAT BELT
Filed June 27, 1968 — 3 Sheets-Sheet 1

INVENTOR.
ROBERT W. STOFFEL
BY
ATTORNEYS

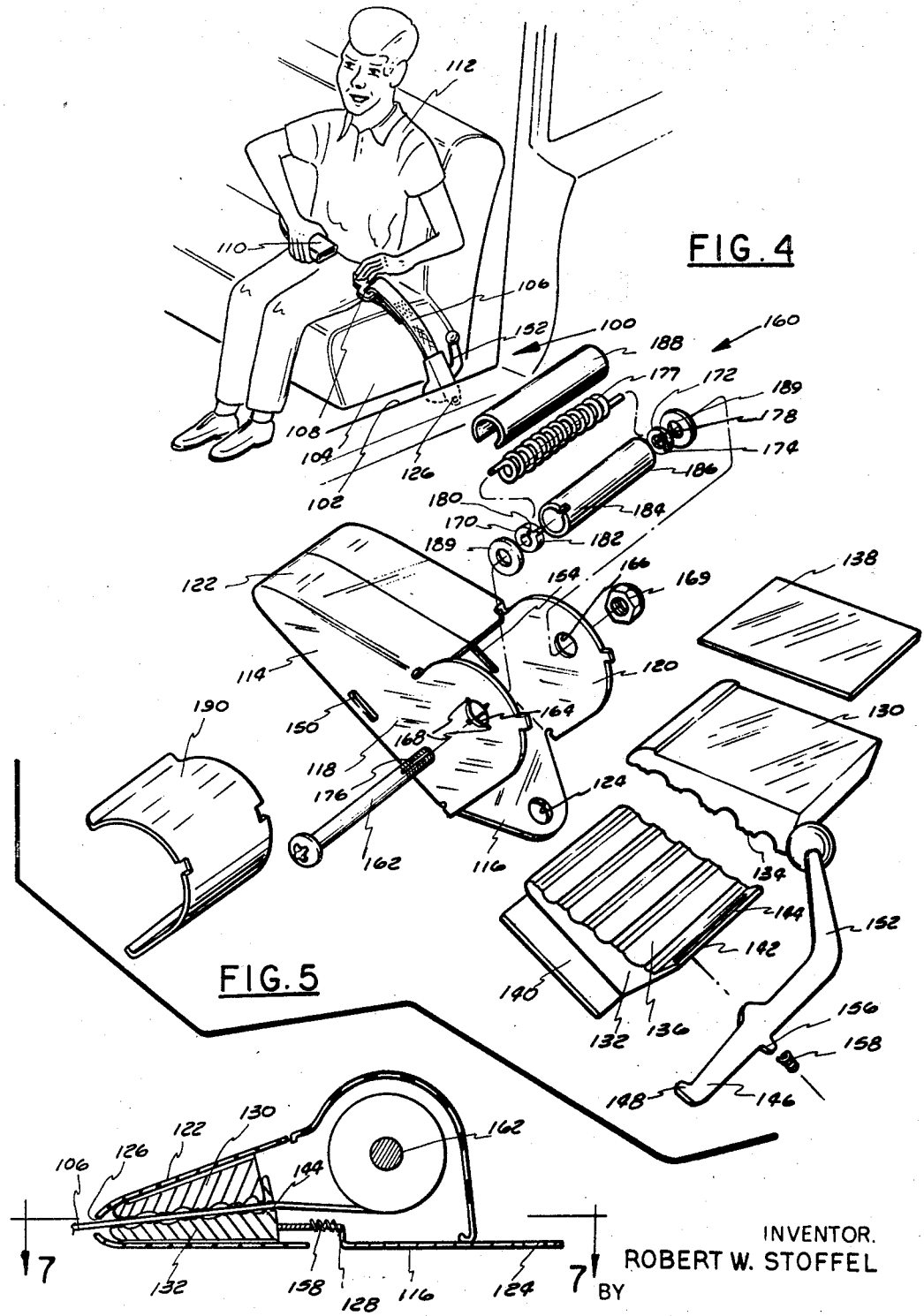

United States Patent Office 3,494,571
Patented Feb. 10, 1970

3,494,571
CLAMPING DEVICE FOR A SEAT BELT
Robert W. Stoffel, Ferndale, Mich., assignor to Jim Robbins Seat Belt Co., Troy, Mich.
Continuation-in-part of application Ser. No. 681,756, Nov. 9, 1967. This application June 27, 1968, Ser. No. 740,705
Int. Cl. B65h 75/48
U.S. Cl. 242—107.2        5 Claims

ABSTRACT OF THE DISCLOSURE

A seat belt device is disclosed for mounting adjacent the seat assembly of a vehicle which has a pair of co-operating, spring-biased clamping jaws for providing a connection between the seat belt and the vehicle. The jaws are normally closed on the belt to anchor it to the vehicle but a manual adjust means allows the user to vary the length of the belt between the vehicle and a coupling member carried on the end of the belt by opening the jaws.

A second embodiment discloses a variation of the device in which a reel-type retractor is connected to the lower end of the belt to wind the unused portion of the belt between the clamping jaws and the reel into a stored reel.

CROSS-REFERENCE TO RELATED APPLICATION

This application is a continuation-in-part of copending patent application Ser. No. 681,756 filed Nov. 9, 1967.

BACKGROUND OF THE INVENTION

In my aforementioned copending patent application, a seat belt device was disclosed for connecting a safety seat belt to the vehicle at different points along the length of the belt. This seat belt device employs a pair of cooperating jaws mounted between a pair of inclined bearing surfaces. The belt is mounted so that it moves as it is extended or retracted by a linear retracting device. The jaws are movable in their housing in one direction toward a clamping position in which they and the belt are wedged between the bearing surfaces, and in the opposite direction in which they are separable to allow the belt to freely move between them. This belt clamping device of my aforementioned application was described in a belt retracting system in which the jaws are normally open so that a user coupled to the belt can freely carry on normal body motions. Means were provided for sensing an abnormal motion of the belt and to move the jaws toward their clamping position in response to such a motion.

SUMMARY

The broad purpose of the present invention is to disclose a device employing the preferred clamping jaws as a means for connecting the seat belt to the vehicle, but, as opposed to the device of my aforementioned copending application, the jaws are normally clamped in the belt and are opened only to allow the user to vary the point at which the belt is connected to the vehicle.

In the preferred embodiment, the device is employed with a belt independently of a belt retracting device. The belt has an upper end connected to a coupling member and a lower end which can be grasped by the user, and an intermediate portion disposed between the clamping jaws of the device. The jaws are supported between the inclined walls of a housing attached to the vehicle adjacent the seat assembly. A spring in the housing urges the clamping jaws toward a wedged, clamping position in which the length of the belt between the clamping device and the coupling element remains fixed.

The user can quickly and easily adjust the point at which the belt is connected to the vehicle to vary the length of its upper end by grasping the lower end of the belt and pulling it with the clamping members away from their wedged, clamping position. This downward motion of the belt shortens its upper end. To increase the length of the upper end, the two clamping members have interconnecting structure and one has a handle which allows the user to push the two clamping members to a release position so that the user can pull the belt upwardly.

A second embodiment of the invention employs a housing in which a spring-biased reel is supported and connected to the lower end of the belt to wind the unused portion of the belt into a compact roll. This embodiment can also be attached to the vehicle structure along the side of the seat assembly.

The arrangement of the clamping jaws in their housing is such that they allow the belt to be either clamped or released by the application of a very nominal effort to open the jaws. In addition, they provide an unyielding connection between the belt and the vehicle when they are in their clamping position.

Other advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 4 is a perspective view of another embodiment of the invention which includes a reel means for winding the slack portion of the belt into a roll;

FIGURE 5 is an exploded view of the retracting device of FIGURE 4;

FIGURE 6 is a sectional view of the device of FIGURE 4; and

DESCRIPTION OF THE PREFERRED EMBODIMENT

Figure 1:
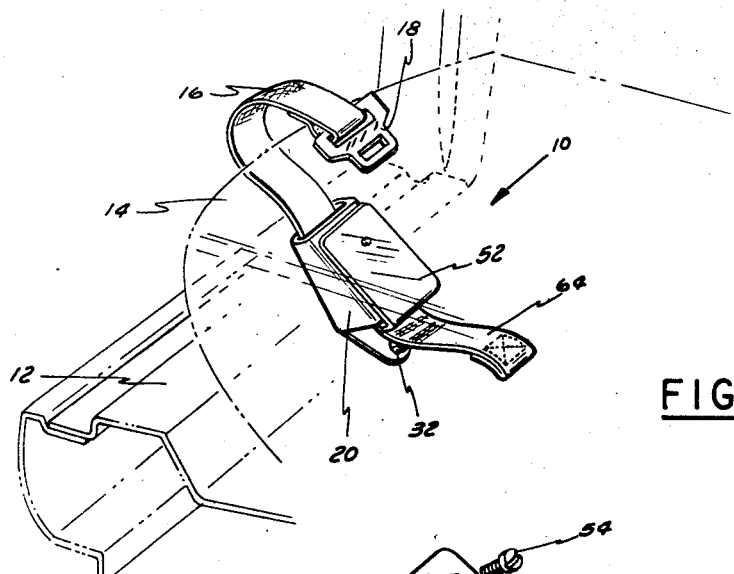
FIGURE 1 is a perspective view of a preferred clamping device mounted in the passenger compartment of a vehicle adjacent the seat assembly.
Figure 2:
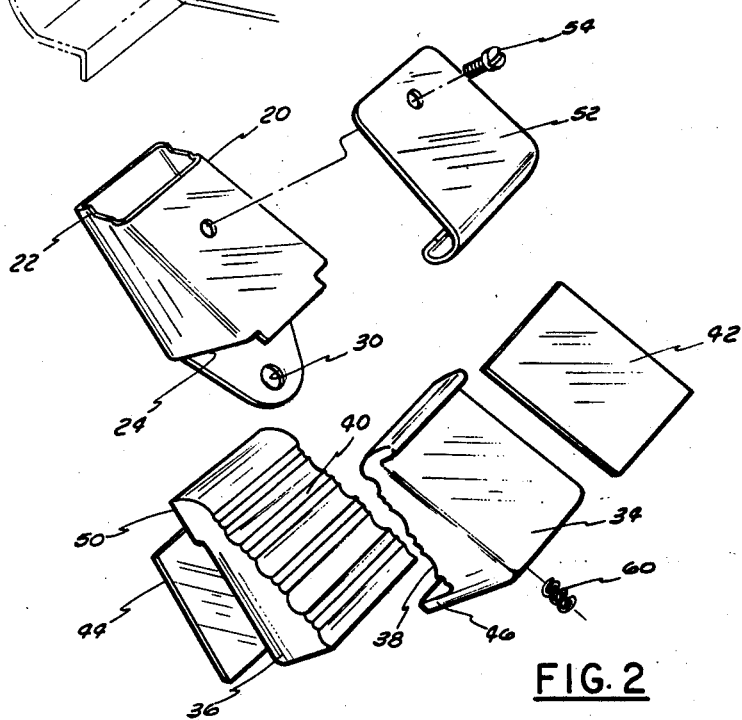
FIGURE 2 is an exploded view of the preferred clamping device of FIGURE 1.
Figure 3:
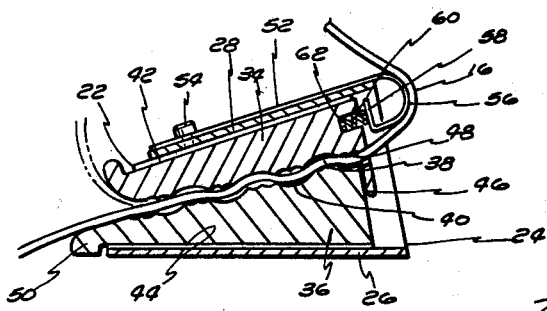
FIGURE 3 is a sectional view of the clamping device of FIGURE 1.
Figure 7:
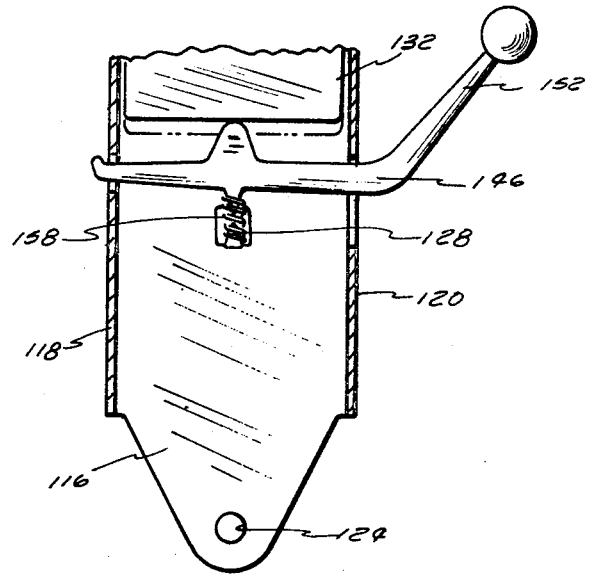
FIGURE 7 is a view of the release handle as seen along lines 7—7 of FIGURE 6.

Now referring to the drawings, FIGURES 1 to 3 illustrate the preferred clamping device, generally indicated at 10, as attached to a structural sill 12 of an automotive vehicle adjacent a seat assembly 14, indicated in phantom, mounted in the passenger compartment of the vehicle. The clamping device 10 provides means for connecting an elongated safety seat belt 16 having a suitable coupling member 18 carried on its outer end to the vehicle. The coupling 18 is intended to be joined with a complementary coupling member (not shown) to form a restraining system for a passenger seated on the seat assembly 14.

The clamping device 10 preferably includes a metal housing 20 having a pair of open ends 22 and 24, a base 26 and a top wall 28 which is inclined with respect to the base 26 from the open end 24 toward the open end 22. The base 26 has an opening 30 for receiving a fastener 32 which attaches the housing 20 to the vehicle.

A pair of cooperating clamping jaws 34 and 36, disposed in the housing 20, are movable between the open ends 22 and 24 toward and away from a clamping position illustrated in FIGURE 3 in which they are wedged between the upper wall 28 and the base 26. The jaws 34 and 36 have confronting clamping surfaces 38 and 40, respectively, provided with ridges and grooves adapted to engage the seat belt 16.

A thin sheet of plastic, low-friction material 42 such as Teflon, is disposed between the upper jaw 34 so that the jaw 34 is slidably movable with respect to the upper wall 28 which provides a bearing surface.

A second thin sheet of a suitable low-friction material 44, such as Teflon, is disposed between the lower jaw 36 and the base 26 of the housing so that the lower jaw is slidably movable with respect to the base 26 which provides a bearing surface.

The upper jaw 34 has a downwardly depending lip 46 which abuts the end of the lower jaw 36 so that as the upper jaw 34 is moved toward the narrow end 22 of the housing, it moves the lower jaw 36 so that they move together toward their wedge position. The lip 46 is formed with a slot 48 through which the belt 16 is threaded. The opposite end of the lower jaw 36 has a downwardly bent handle portion 50 which extends through the open end 22 and provides means for the user to move the two jaws 34 and 36 away from their clamping position by applying a force on the lower jaw toward the open end 24. As the lower jaw 36 is moved by a release effort applied on the handle 50, it engages the lip 46 to move the upper jaw 34 so that the two jaws move together.

A sheet metal web guide 52 is attached to the upper wall 28 of the housing by a fastener 54 and has a bent portion 56 which acts as a guide for the belt when a force is applied to its lower end. The inner end of the web guide 52 has a lip 58 which provides a bearing surface for a spring 60 which projects from a socket 62 in the end of the upper jaw 34. The spring 60 biases the upper jaw 34 and the lower jaw 36, by means of the lip 46, toward their clamping position.

In operation, the belt 16 is normally connected to the support housing 20 by the jaws 34 and 36 which are normally in their wedged clamping position. The length of the belt between the coupling 18 and the clamping device 10 can be reduced by the user pulling the lower end 64 of the belt which is sufficient to pull the two jaws 34 and 36 down from their clamping position so that they separate from one another sufficiently to allow the belt 16 to move between them. When the user releases the lower end of the belt, the spring 60 snaps the two jaws 34 and 36 toward their clamping position so that they clamp the belt to the housing 20 and prevent motion of the belt toward the narrow end 22 of the housing.

To increase the length of the belt between the coupling 18 and the clamping device 10, the user applies a release effort on the handle 50 of the lower jaw to push the two jaws away from their clamping position. While holding the jaws in this position, he then moves the belt upwardly through the narrow end 22 of the housing until the length of the upper end of the belt has been suitably increased.

The clamping device 10 requires but a nominal force applied on the lower end of the belt to move the clamping members 34 and 36 a sufficient distance to release the belt for motion. On the other hand, the inclination of the upper wall 28 and the base 26 of the housing is such that when the force on the lower end of the belt is released, the two clamping members move a very small distance to provide a non-yielding rigid connection between the belt 16 and the housing 20.

Referring to FIGURES 4 to 7, a seat belt device generally indicated at 100, illustrates another embodiment of the invention and is mounted on the interior of a vehicle 102 adjacent a seat assembly 104 to provide means for connecting a seat belt 106 to the vehicle. A tongue 108 carried on the outer end of the belt 106 is adapted to be engaged with a buckle device 110 to form a body restraining system for a passenger 112 disposed on the seat assembly 104.

The device 100 comprises a housing 114 formed of sheet metal with a flat base 116 having a pair of upturned sides 118 and 120. The upper portions of the sides 118 and 120 are bent toward one another to form an upper wall 122 which is inclined with respect to the base 116. The base is formed with a suitable opening 124 for receiving a fastener 126 to attach the housing to the vehicle 102. The housing also has an opening 126 for receiving the belt 106. The base 116 of the housing also has an upturned tab 128 which is bent toward the opening 126.

A pair of cooperating jaws 130 and 132 are disposed between the top wall 122 and the base 116. The jaws are movable toward and away from the opening 126 and a clamping position in which they are wedged between the top wall 122 and the base 116. The jaws 130 and 132 are formed with clamping surfaces 134 and 136 which are engageable with opposite sides of the belt 106 so that in their clamping position they form a connection between the belt 106 and the housing 114.

A sheet of suitable low-friction material 138 is disposed between the upper jaw 130 and the top wall 122 of the housing to assist the jaw 130 in moving toward and away from its clamping position with the top wall 122 providing a bearing surface. Similarly a sheet of low-friction material 140 is disposed between the lower jaw 132 and the base 116 of the housing to assist the lower jaw 132 in moving toward and away from its wedged, clamping position with the base 116 providing a bearing surface for the lower jaw.

The rear end of the lower jaw 132 has an upwardly extending lip 142 which abuts the rear end of the upper jaw 130 so that when the lower jaw 132 is moved toward its clamping position, it moves the upper jaw 130 in the same direction. The tab 142 has a slot 144 through which the belt passes and which acts as a guide for the inner end of the belt as the belt is moved between the jaws.

An elongated handle 146 is disposed between the lower jaw 132 and the tab 128 with one end 148 pivotally disposed in a slot 150 in the side 118 of the housing and an outer arm 152 extending through a slot 154 in the side 120 of the housing. The handle 146 is movable toward and away from the tab 128 and has a finger 156 for supporting a spring 158 which is mounted on the tab 128. The spring 158 biases the handle 146 toward the lower jaw 132 which in turn biases the two jaws toward their clamping position. By moving the handle 156 rearwardly, the user can effectively disable the spring 158, that is, disconnect the bias of the spring 158 from the jaws so that they can be moved rearwardly away from the opening 126.

A real means generally indicated at 116 is mounted between the sides 118 and 120 and comprises an elongated anchor bolt 162 which is received through a pair of openings 164 and 166 in the sides 118 and 120 and has a series of projections (not shown) under its head which engage a series of recesses 168 formed around the opening 164 so that the bolt 162 can be locked against rotation when joined with a nut 169. A pair of plastic bushings 170 and 172 are mounted on the bolt 162 between the sides 118 and 120. The bushing 172 has an inwardly directed key-like portion 174 which engages a key-way 176 in the anchor bolts so that the bushing 172 is locked against rotation.

A wind-up spring 177 is wrapped around the bolt 172 with one end received by an aperture 178 in the bushing 172 and its opposite end received in an aperture 180 in the bushing 170. It is to be understood that the bushing 170 can rotate about the anchor bolt 162. The bushing 170 has an outwardly directed key-like portion 182 which engages a slot 184 in the end of the sleeve 186. Normally both bushings 170 and 172 are disposed adjacent the ends of the sleeve 186 with the sleeve 186 and the bushing 170 being rotatable about the bolt 162. A pair of spacers 189 are disposed between the ends of the sleeve 186 and the sides of the housing 114 to assist the reel in rotating.

When rotated in an unwind direction, the bushing 170 pretensions the spring 177 so that the spring can rotate the bushing 170 and the sleeve 186 in the opposite wind direction. The inner end of the belt 106 is stitched into a loop which is disposed around the sleeve 186. A clamping member 188 clamps the looped end of the belt to the sleeve so that as the sleeve 186 rotates in a wind direction, the belt is wound into a roll. Similarly when the sleeve 186 rotates in its opposite unwind direction, it allows the belt to be unrolled.

When sleeve 186 is rotated in the wind direction, it causes the belt to be retracted into the housing 114, so that it moves between the jaws toward the reel means. When the belt is being extended from the housing through the opening 126, it moves in the opposite direction between the jaws 130 and 132 as it unwinds from the reel means.

A cover member 190 is mounted on the housing and encloses the reel means so that the wound-up lower end of the belt 106 is enclosed.

In operation, the jaws 130 and 132 are normally biased by the spring 158 toward their clamping position, and the reel means is normally biased by the spring 177 in its wind direction. The springs 158 and 177 are chosen so that the wind-up force on the belt by the spring 177 is insufficient to pull the jaw members 130 and 132 away from their clamping position when the handle 152 is in abutment with the lower jaw member 132, and biased toward the opening 126 of the housing by the spring 158. When the user applies a release effort on the arm 152 of the handle so that the handle moves away from the lower jaw member 132 thereby effectively disabling the bias of the spring 158 on the jaws, the wind-up force acting on the belt by the spring 177 is sufficient to move the belt between the jaws 130 and 132 toward their wound up position within the housing. As the belt moves toward the reel, it moves the jaws 130 and 132 away from the opening 126 and their clamping position until they separate sufficiently to allow the belt to freely move. When the handle 146 is released, the spring 158 snaps the two jaws back toward their clamping position. Thus the user by manipulating the handle 146 can either extract the belt from the reel means or allow it to be retracted by the reel means in order to vary the length of the belt which is extended from the housing 114.

The embodiment shown in FIGURES 4 to 7, like the embodiment of FIGURES 1 to 3, also provides a clamping action in which a fairly nominal release effort can move the jaws to their release position so that the belt can be freely moved between the jaws, however when the release effort is removed the jaws quickly snap into their normal, clamping position to provide an unyielding connection between the belt and the vehicle.

Although I have described but two embodiments of my invention, it is to be understood that various changes and revisions can be made in the preferred embodiments without departing from the spirit of the invention.

Having thus described my invention, I claim:

1. In a safety seat belt system for a vehicle the combination comprising:
   (a) a support having a pair of spaced, opposed, bearing surfaces, one of said bearing surfaces being inclined with respect to the second of said bearing surfaces;
   (b) a pair of cooperating jaws disposed between said bearing surfaces, said jaws being movable between a normal clamping position in which they are wedged between said bearing surfaces, and a release position in which they are unwedged, and having confronting clamping surfaces engageable with a seat belt disposed between them;
   (c) an elongated safety seat belt having one end adapted for connection to a coupling means and a portion between the clamping surfaces of said jaws;
   (d) means biasing the jaws toward their clamping position so that the belt is normally connected by the jaws to the support; and
   (e) means for moving said jaws to their release position to allow motion of the belt between the jaws so that the point on the belt connected to the vehicle can be varied.

2. The combination as defined in claim 1, wherein the jaws are movable toward their clamping position from their release position in a first direction and toward the release position from the clamping position in the opposite, second direction; and the means for moving the jaws to their release position comprises the opposite end of the belt with one end being disposed so that a user, by pulling the belt can move the jaws in their second direction away from their clamping position.

3. The combination as defined in claim 1, wherein the jaw members are movable between said bearing surfaces in a first direction toward their clamping position and in the opposite direction toward their release position, and including reel means journaled on the support for rotation in a wind direction and in the opposite, unwind direction, and the opposite end of the belt being coupled to said reel means to be wound thereon as the reel means rotates in its wind direction and to be unwound therefrom as the reel means rotates in its unwind direction; bias means operative to rotate the reel means in the wind direction when the jaws are in their release position and inoperative to rotate the reel means in the wind direction when the jaws are in their clamping position.

4. The combination as defined in claim 3, including structure inter-connecting the jaws so a motion of a first of the jaws towards its release position moves the second jaw member toward its release position, and motion of the second of said jaws toward its clamping position moves the first jaw member toward its clamping position; and wherein said first mentioned bias means acts on the second jaw member to bias it toward its clamping position.

5. In a safety seat belt system, for a vehicle having a seat assembly, the combination comprising:
   (a) a support housing adapted for mounting adjacent said seat assembly and having a pair of spaced, opposed bearing surfaces, one of said bearing surfaces being inclined with respect to the second of said bearing surfaces;
   (b) a pair of cooperating jaws disposed between said bearing surfaces for motion in a first direction toward a normal clamping position in which the jaws are wedged between said bearing surfaces, and in the opposite, second direction towards a release position in which the jaws are unwedged, said jaws having confronting clamping surfaces for engaging a seat belt disposed between them;
   (c) low-friction means between each of said jaws and said bearing surfaces so that each jaw is slidably movable with respect to one of the bearing surfaces;
   (d) structure inter-connecting the jaws so that motion of the first of the jaws towards its release position moves the second jaw toward its release position, and motion of the second jaw toward its clamping position moves the first jaw toward its clamping position;
   (e) reel means journaled on said support and spaced in the second direction of the jaw members from their release position, said reel means being rotatable in a wind direction and in the opposite, unwind direction;
   (f) first bias means in said support housing for urging said jaws in the first direction toward their clamping position;
   (g) second bias means for urging the reel means in its wind direction;
   (h) an elongated seat belt having a first end adapted for carrying a coupling member, its opposite, second end coupled to said reel means, and adapted to be wound thereon upon rotation of the reel means in its wind direction, and to be unwound therefrom upon rotation of the reel means in its unwind direction, and a portion between the clamping surfaces of the first and second jaws for motion in a first direction, parallel to the first direction of motion of the jaws to rotate the reel means in its unwind direction at such times as the jaws are in their release position, and for motion in a second, opposite direction as said reel means rotates in its wind direction; and (i) handle means on said support for disabling said first bias means so that the reel means under the influence of the second bias means is operative to move the seat belt in the second direction and thereby move the jaws away from their clamping position to release the belt, said jaws being operative to provide a connection between said seat belt and said support at such times as the belt is not moving in its second direction and the first bias means is not disabled.

References Cited

UNITED STATES PATENTS

| | | | |
|---|---|---|---|
| 2,511,579 | 6/1950 | George | 24—171 |
| 3,231,307 | 1/1966 | Smith | 297—388 |
| 3,249,386 | 5/1966 | Board et al. | |
| 3,262,738 | 7/1966 | Jantzen | 297—388 |
| 3,287,062 | 11/1966 | Board et al. | 242—107.2 XR |
| 3,389,874 | 6/1968 | Van Noord | 242—107.2 |
| 3,414,291 | 12/1968 | Jantzen | 297—385 XR |

FOREIGN PATENTS 176,521   10/1906   Germany.

STANLEY N. GILREATH, Primary Examiner

W. H. SCHROEDER, Assistant Examiner

U.S. Cl. X.R.

24—171; 280—150; 297—388